United States Patent [19]

Avery

[11] Patent Number: 4,718,825
[45] Date of Patent: Jan. 12, 1988

[54] ACTIVE CONTROL SYSTEM FOR HIGH SPEED WINDMILLS

[76] Inventor: Don E. Avery, 45-437 Akimala St., Honolulu, Hi. 96744

[21] Appl. No.: 875,931

[22] Filed: Jun. 19, 1986

Related U.S. Application Data

[63] Continuation of Ser. No. 678,708, Dec. 6, 1984, abandoned.

[51] Int. Cl.$^4$ .................... F04B 49/00; F04B 17/02; F16H 35/08
[52] U.S. Cl. .................... 417/218; 417/336; 60/398; 416/170 R; 74/41; 74/833
[58] Field of Search .................... 417/212, 218–222, 417/334–336, 15, 35, 53; 92/13.1, 13.7; 60/398; 74/41, 601, 831, 833, 834; 416/170 A

[56] References Cited

U.S. PATENT DOCUMENTS

| | | | |
|---|---|---|---|
| 17,862 | 7/1857 | Allen | 74/601 |
| 165,112 | 6/1875 | Mills | 74/41 X |
| 418,877 | 1/1890 | Salisbury | 74/41 |
| 617,877 | 1/1899 | Harris | 417/218 |
| 637,736 | 11/1899 | Herisson | 74/41 |
| 841,601 | 1/1907 | Summers et al. | 417/218 X |
| 1,417,986 | 5/1922 | Giesler | 74/41 |
| 1,675,159 | 6/1928 | Burch | 417/218 |
| 1,755,422 | 4/1930 | Bucklen | 416/170 A X |
| 1,813,078 | 7/1931 | Nyrop | 74/834 X |
| 2,484,291 | 10/1949 | Hays | 416/11 X |
| 2,555,787 | 6/1951 | D'Amelio | 417/336 X |
| 2,688,285 | 9/1954 | Stockett, Jr. et al. | 417/218 X |
| 3,957,397 | 5/1976 | Wendler | 417/334 X |
| 4,392,785 | 7/1983 | Avery | 417/218 |
| 4,507,060 | 3/1985 | Sutz | 417/336 |
| 4,576,064 | 3/1986 | Kentfield | 417/218 X |

FOREIGN PATENT DOCUMENTS

| | | | |
|---|---|---|---|
| 101963 | 9/1937 | Australia | 417/218 |
| 1145101 | 10/1957 | France | 416/170 A |
| 2112463 | 7/1983 | United Kingdom | 60/398 |

Primary Examiner—Carlton R. Croyle
Assistant Examiner—Paul F. Neils
Attorney, Agent, or Firm—James Creighton Wray

[57] ABSTRACT

A pump stroke is matched to the operating speed of a high speed windmill. The windmill drives a hydraulic pump for a control. Changes in speed of a wind driven shaft open supply and exhaust valves to opposite ends of a hydraulic actuator to lengthen and shorten an oscillating arm thereby lengthening and shortening the stroke of an output pump. Diminishing wind to a stall speed causes the valves to operate the hydraulic cylinder to shorten the oscillating arm to zero. A pressure accumulator in the hydraulic system provides the force necessary to supply the hydraulic fluid under pressure to drive the actuator into and out of the zero position in response to the windmill shaft speed approaching and exceeding windmill stall speed.

8 Claims, 4 Drawing Figures

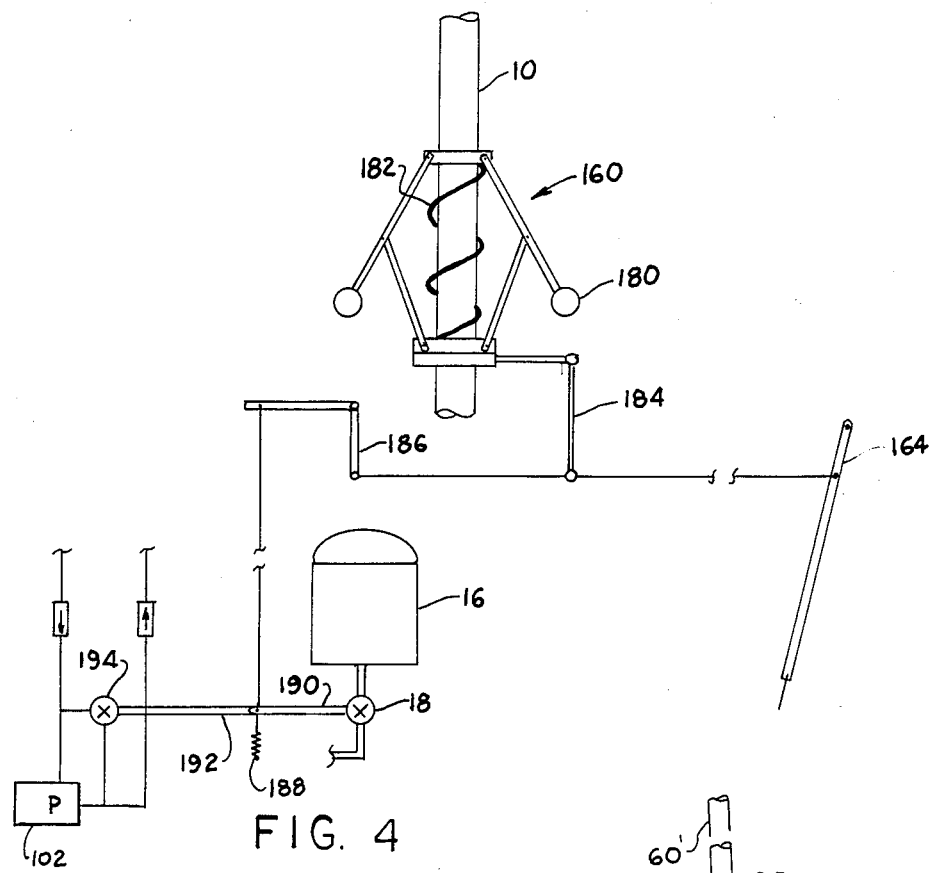
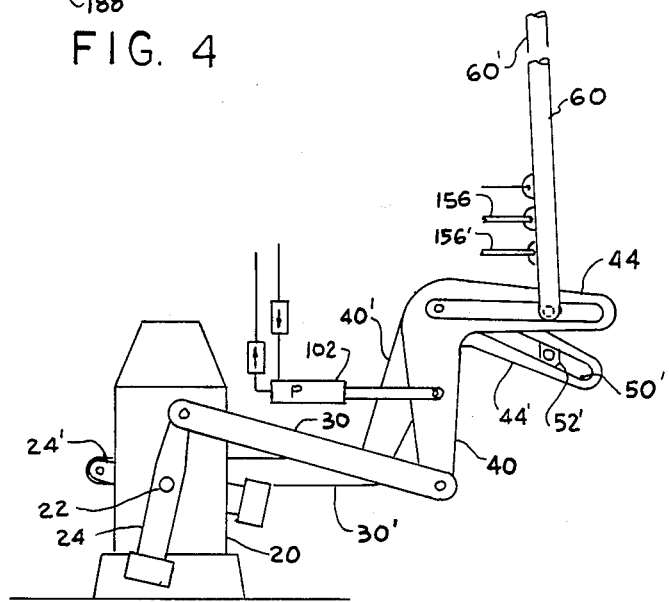
FIG. 4
FIG. 3

ACTIVE CONTROL SYSTEM FOR HIGH SPEED WINDMILLS

The Government has rights in this invention pursuant to Contract No. DE-FG03-81SF11622 awarded by the U.S. Department of Energy.

This application is a continuation of application Ser. No. 678,708, filed 12-6-84, now abandoned.

BACKGROUND OF THE INVENTION

A pump stroke control system for a windmill is described and claimed in U.S. Pat. No. 4,392,785 to Don E. Avery, the disclosure of which and the description of the background references of which are incorporated herein by reference.

While the system described in U.S. Pat. No. 4,392,785 is completely suitable for use with windmills, a need persists for other control systems which may be as suitable and which may be particularly suited for high speed, low surface area windmills.

Low surface area windmills which are characterized, for example, by long aircraft-like propellers with diameters of 23 feet or more have many advantages. One obvious advantage of a high speed rotors is the greater amount of power which is available from it. Another advantage is a dramatically lighter rotor. Each of the three work blades in one example weighs about 21 pounds. With the hub included, the estimated weight of a 23 foot diameter rotor is about 100 pounds. A galvanized sheet metal multivane rotor would weigh over 2,000 pounds. In storm conditions there is much less area to be impacted making lighter supporting structure possible for low surface area, high speed rotors. In addition, the light rotor has a much smaller mass moment of inertia which means that it will respond better to gusty winds and pump more water due to the "wind speed cubed" factor in power output. Low surface area or low solidity rotors have low output torques at low speeds. The special characteristics of a low solidity, high speed windmill provides a requirement for a special output control system.

"Wind speed cubed" is a phrase well known to those familiar with and skilled in the art and simply means that the available power from the wind increases in proportion to the wind speed cubed (w.s.$^3$). This can be easily proved using the basic equation for kinetic energy which is $KE = \frac{1}{2} MV^2$. The wind force, when blowing perpendicular to a flat plate, is proportional to the wind speed squared.

For a more detailed explanation, reference is made to the inventor's prior U.S. Pat. No. 4,392,785. Wind blowing against flat plate 18 stretches spring 48 and causes point 72 to move in proportion to the wind speed squared. The location of point 72 fixes the stroke length and therefore the pump "size" and torque on the rotor shaft. If the spring constant of spring 48 is of the correct value, the windmill will operate at or near the tip speed ratio (TSR) for maximum output and the machine will speed up or slow down in direct proportion to the wind speed, thus causing the output to vary in proportion to the windspeed cubed.

SUMMARY OF THE INVENTION

The present invention provides a windmill load control system and particularly a pump stroke control system for a low solidity, high speed windmill. As wind diminishes and the rotor approaches stall speed, the pump stroke control system of the present invention removes the output load from the windmill by controlling the pump stroke to zero. As wind increases and rotor speed increases above stall speed, stored power in the control system increases the effective length of the lever and the effective stroke of the output pump from zero to a maximum as the windmill approaches maximum speed.

In the preferred embodiment, the control system has a hydraulic pump which supplies a pressure side which includes an accumulator under pressure to supply the necessary force to adjust the oscillator arm to zero at low speeds and to lengthen the lever away from zero as the windmill increases speed.

In a preferred embodiment of the invention, two sets of two valves each respectively control paired supply and exhaust lines to supply and exhaust opposite ends of the hydraulic cylinder actuator which controls the lever length and the pump stroke.

In the preferred embodiment, the vertical power shaft from the windmill is a rotary shaft and a gear box at the bottom of the shaft reduces the speed, of rotation of the shaft to crank speed which is within the desired output load cycling speed. The crank is connected to a second crank which includes the adjustable oscillating arm. Lengths for the first crank and the drive arm of the second crank are selected so that the adjustable oscillating arm of the second crank moves through approximately 45 degrees. In a preferred embodiment, the adjustable lever arm of the second crank contains a roller way which extends the length of the arm from the zero or pivot point of the crank to an outer extension of the adjustable arm. A roller is mounted in a roller way, and the roller is connected to one end of the second connecting rod which is connected to the driven end of the pump jack. The pump jack is mounted on a central fulcrum. An arcuate head at the driving end of the jack carries cables which are attached to the pump to pull the pump rod downward and upward as the windmill shaft turns the crank. The downward and upward movement of the pump is controlled from zero to a maximum according to the position of the roller and adjustable oscillating lever arm.

When the vertical windmill shaft is a reciprocating shaft, the gear box may be dispensed with, and the first crank may be connected near a lower end of the reciprocating windmill shaft, with respective lengths of arms of the first crank and the second crank being controlled so that the adjustable oscillating arm of the second crank moves through an arc of about 45 degrees.

In a preferred embodiment of the invention, the hydraulic control pump is driven by the first connecting means which includes the first arm of the second crank. Preferably, the piston rod of the hydraulic pump is connected to the first arm of the crank. In the preferred embodiment of the invention, the hydraulic actuator which controls the effective length of the oscillating lever arm is connected to the second connecting rod which connects the oscillating lever arm to the pump jack. The hydraulic cylinder of the actuator is mounted on a pivot. A piston rod extends from the hydraulic cylinder and is connected to the second connecting rod at such a position that the piston moves the roller at the end of the connecting rod between a zero position at the pivot of the oscillating lever arm and a maximum stroke position at the distal end of the oscillating lever arm. In the preferred embodiment, the control for the valves which in turn control movement of the piston within the hydraulic cylinder, is a linkage with a control lever. An intermediate point on the control lever is driven by a governor mechanism connected to the rotating shaft. As the shaft increases speed, the governor mechanism pulls the control lever against spring force. A distal end of the control lever moves a linkage to open a first pair of valves to in turn supply pressure to an inner end of the hydraulic cylinder and to connect a return line to the other end of the hydraulic cylinder, forcing the second connecting rod outward and increasing the effective length of the oscillating arm. The outward movement of the connecting rod pulls a cable against spring force to move a lower or opposite end of the control lever in the same direction as the governor moves the intermediate point on the control lever, which has the effect of moving the first, upper end of the control lever and the connected linkage back toward a neutral position in which the control valves are closed. In sequence, the governor effects a small opening movement of one set of valves by moving the upper end of the lever and the linkage away from a neutral position. As the hydraulic cylinder increases stroke length by moving the connecting rod away from the pivot of the oscillating lever arm, the feedback cable pulls the lower end of the control rod and returns the upper end of the control rod to the central neutral position in which all of the control valves are closed. Increased speeds of the drive shaft continue the process until the maximum extension of the oscillating lever arm is reached. Diminishing winds and reduced speeds of the shaft move the control lever in the opposite direction, opening the second set of valves to draw the piston inward in the cylinder, and the feedback cable moves the lower end of the rod to return the upper end to the neutral, valve closed position.

When the shaft is operating at maximum speed, the speed of the control pump provides hydraulic fluid under greater pressure than necessary to maintain the accumulator at the maximum desired pressure. At that point, an unloading valve opens and permits the pump to cycle hydraulic fluid without increasing the pressure in the accumulator.

Preferably the governor controls the closing of a valve at the accumulator so that the system is not pressurized by the accumulator while the governor is at the zero position. At the same time, the governor opens a pump bypass valve so that the pump does no work while the shaft is operating at low speed.

An object of the invention is to provide a control system that has lever means interposed between said element and said pump for varying the length of stroke of the piston in said pump and control means responsive to the velocity of the wind to operate said lever means to vary the length of stroke and hence the effective displacement of said pump in accordance with available wind energy wherein the control means comprises means connected to the wind driven element for sensing speed of the wind driven element and response means connected to the speed sensing means and to the lever means for changing the lever means to vary length of the stroke of the pump in response to the speed of the wind driven element.

These and other and further objects and features of the invention are apparent in the disclosure which includes the above and ongoing description and claims and the drawings.

BRIEF DESCRIPTION OF THE DRAWINGS

FIG. 3 is a schematic detail of a pumping system employing two cranks to drive two double acting pumps 90 degrees out of phase.

FIG. 4 is a schematic representation of a governor for controlling valve control lever and a low-speed accumulator shut off and pump bypass.

DETAILED DESCRIPTION OF THE DRAWINGS

Figure 1:
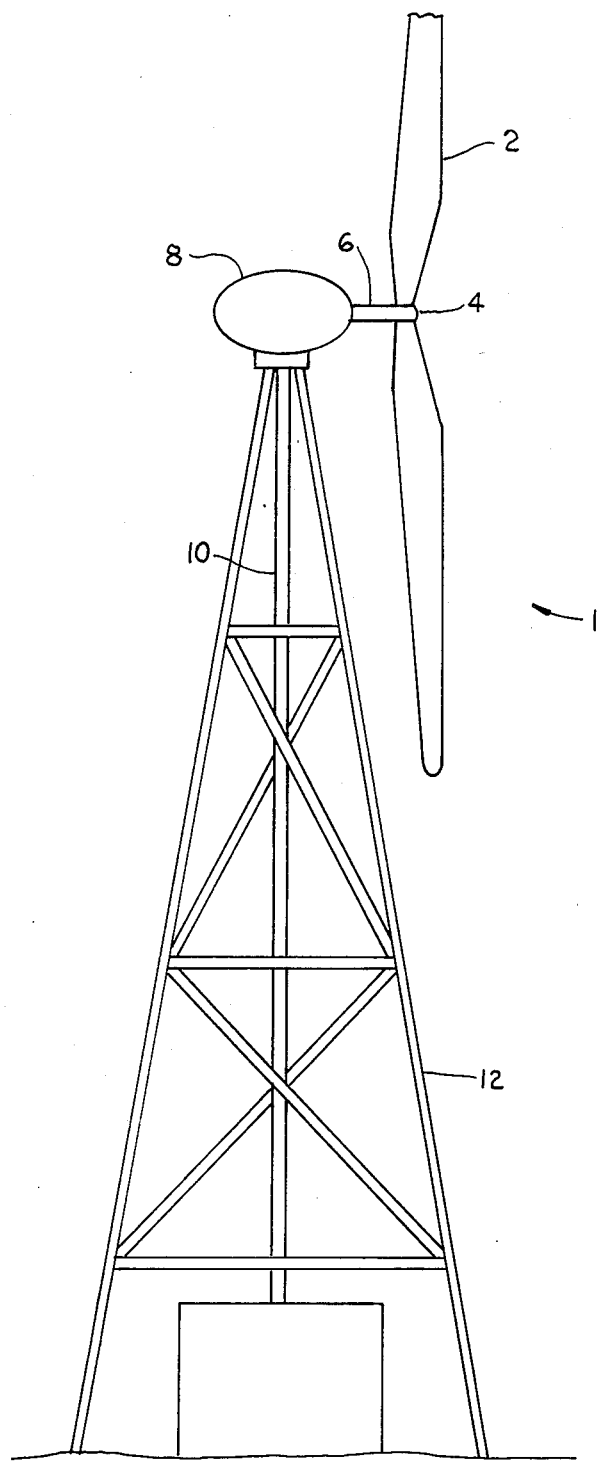
FIG. 1 is a schematic representation of a low-solidity windmill used with the present invention.

The low-solidity windmill is generally indicated by the numeral 1 in FIG. 1. Typically, the windmill may have three high aspect ratio propeller-like blades with a diameter of about 23 feet. The blades are permanently mounted on a hub 4 which is mounted to horizontal shaft 6 which drives a bevel gear in a gear box 8 to drive a shaft 10.

Figure 2:
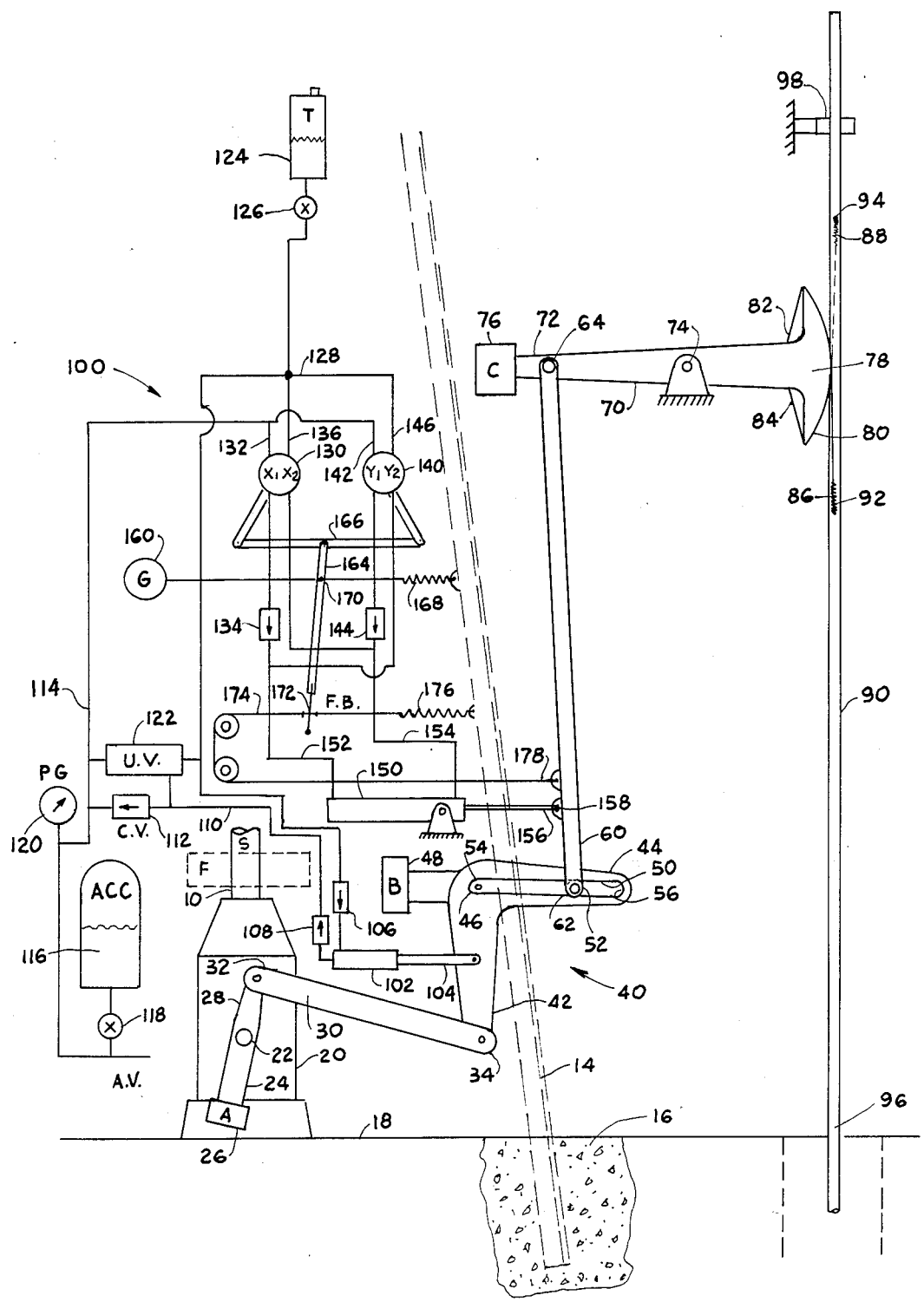
FIG. 2 is a schematic representation of the pump control system for high-speed, low-solidity windmills.

Since the weight of the blades, hub, horizontal shaft and gear box 8 are relatively light as compared with high-solidity, multi-vane windmills, the supporting structure 12 may be relatively light. As shown in FIG. 2, legs 14 of the supporting structure are anchored in concrete 16. A concrete pad 18 supports a gear box 20 at the base of the rotating shaft 10. Gear box 20 contains appropriate reduction gears which may include planetary gearing to reduce the speed of shaft 10 to a suitable speed for horizontal shaft 22 which operates a crank 24 with a counterweight 26. One end 28 of the crank 24 is connected to a first end 32 of a connecting rod 30. Second end 34 of the connecting rod is connected to the end of an arm 42 of an adjustable lever assembly 40. Lever 40 has arms 42 and 44 which pivot around pivot point 46. Counterweight 48 is attached to the arm. Arm 44 has an internal track 50 in which a roller 52 is mounted for movement between a proximal end 54 of the track 50 which is coincident with pivot axis 46, and a distal end 56 of the track 50. Roller 52 is mounted on the lower end of the second connecting rod 60. When the roller 52 is in the inner position 54 of track 50, no motion is imparted to connecting rod 60 as lever 40 is oscillated through a 45 degree arc. When roller 52 is in the outer most position 56 of track 50, the connecting rod 60 undergoes maximum vertical oscillations. The upper end 64 of the second connecting rod 60 is connected near one end 72 of pump jack 70.

The pump jack 70 is supported on trunnion 74. Counterweight 76 is positioned on the first end 72 of the pump jack 70. The second head end 78 has an arcuate outer surface 80. Cables 82 and 84 have first ends connected to the pump jack and pass over the arcuate surface 80 and have second ends 86 and 88 connected via heavy shock springs 92 and 94 to the pump rod 90. A lower end 96 of the pump rod 90 is connected to a double acting pump. An upper end of the pump rod 90 slides in a guide bushing 98.

A control system is generally indicated by the numeral 100. Pump 102 has a piston rod 104 connected to arm 42 of the oscillating arm 40. Check valves 106 and 108 control flow of hydraulic fluid into and out of the pump 102. Pump output line 110 passes through a check valve 112 to pressure line 114. Accumulator 116 is connected to the pressure line 114 by a shut off valve 118, which is closed when the windmill is stopped or is operating at low speeds to conserve pressure in the accumulator 116. Gauge 120 indicates the pressure in line 114. When the windmill is operating and the pump 102 increases the pressure in accumulator 116 to a predetermined maximum, unloading valve 122 opens to permit the pumped hydraulic fluid to recycle without increasing pressure in line 114. A supply tank 124 connected by valve 126 supplies hydraulic fluid to the low pressure return lines 128 to maintain the fill of hydraulic fluid in the control system. Double valves 130 concurrently open and close to control flow of fluid respectively through the supply line 132 and the return line 136. Double valves 140 concurrently open and close to control flow of fluid through the supply line 142 and check valve 144 and return line 146. Double acting hydraulic actuator 150 has hydraulic lines 152 and 154 connected to opposite ends thereof. An internal piston moves a piston rod 156 which is connected at its distal end to pivot 158 on connecting rod 60. When lines 152 and 154 are connected by valves 130 to supply lines 132 and return lines 136 respectively, piston rod 156 moves to the right, pushing connecting rod 60 and roller 52 outward in track 50 and increasing the stroke of the connecting rod 60, pump jack 70 and pump rod 90. Conversely, when valves 140 connect lines 152 and 154 to supply lines 142 and return lines 146 respectively, piston rod 156 is pushed to the left, drawing connecting rod 60 and roller 52 inward and reducing the length of the stroke of pump rod 90. Governor 160 which is driven by shaft 10 operates through control lever 164 and linkage 166 to selectively open either valves 130 or valves 140 as the speed of the shaft 10 changes. Moving linkage 166 to the left opens valve 130 and to the right opens valve 140. Tension spring 168 tends to pull the midpoint 170 of the lever to the right, while governor 160 tends to pull the midpoint 170 to the left as the speed of the shaft 10 increases.

The lower end 172 of the lever 164 is connected to a feedback cable 174 which is anchored at one end by a spring 176 to a fixed surface. The other end 178 of cable 174 is connected to connecting rod 60.

In operation, as governor 160 senses an increased speed of shaft 10, the governor draws the midpoint 170 of lever 164 toward the left, opening valves 130. Valves 130 connect the supply line 132 to actuator line 152 and exhaust line 136 to actuator line 154. Pressure in supply line 132 causes the piston rod 156 to move to the right, pushing the connecting rod 60 to the right to lengthen the stroke of the connecting rod and the pump rod 90. As the connecting rod 60 is pushed to the right, cable end 178 is pulled to the right causing feedback cable 174 to pull the adjustable lower end 172 of the control lever 164 to the left, which has the effect of moving the control linkage 166 to the center position in which valves 130 and 140 are closed. The connecting rod 60 remains in its relative position on oscillating lever arm 44 until a change of speed of shaft 10 is sensed by governor 160. When the speed of shaft 10 increases, the same action increases to open valves 130 to move connecting rod 60 to the right and then to close valves 130.

When the wind diminishes and the speed of shaft 10 is reduced, governor 160 reduces its pull upon midpoint 170 and spring 168 pulls midpoint 170 toward the right. That action moves linkage 166 to the right and opens paired valves 140. Valves 140 respectively connect supply 142 through check valve 144 to actuator line 154 and connect actuator line 152 to return line 146, causing piston rod 156 to move to the left, drawing connecting rod inward to reduce the stroke. The spring 176 pulls the lower point 172 of the control rods 164 to the right, moving the lever 164 around balanced midpoint 170 and moving linkage 166 to its centered position in which valves 140 and 130 are closed. As shaft 10 drops to stall speed, governor 160 returns to its inactive position and spring 168 pulls the midpoint of 170 of control lever 164 to the right, opening valves 140 which pull connecting rod 160 to its left-most position in which lever 52 is concentric with the pivot 46 of the oscillating lever arm 40. In that position, connecting rod 60 and pump rod 90 are stopped. The dropping of the governor to its shut position, closes valve 118 to maintain pressure in accumulator 116.

The control means generally indicated by the numeral 100 includes the speed sensing means 160 and the remainder of the elements 102 through 178 which are generally referred to as the response means.

As shown in FIG. 3, in one preferred form of the invention, shaft 22 extends through the gear box 20, and a second crank 24' is mounted on the other end of the shaft at a 90 degree interval to the first crank 24. Connecting rod 30' drives oscillating lever arm 40' to move a connecting rod 60' through a stroke which is controlled by the position of roller 52' in track 50'. A similar piston rod 156' and a feedback system not shown control the relative position of the connecting rod 60' on lever arm 44'. Both pump cylinders are controlled by one set of actuating valves.

Using the two parallel connecting rods 60 and 60' to drive two pump jacks and two pump rods and two double acting pumps ninety degrees out of phase, smooths the power consumption and output of the pumps.

As schematically shown in FIG. 4, shaft 10 operates the governor generally indicated by the numeral 160. As the speed of shaft 10 increases, flyweights schematically represented as 180 move upward against the force of spring 182 causing lever 184 to pull the control lever 164 to the left. As the speed of shaft 10 decreases and the flyweights 180 drop to their lowest position, lever 184 and connected lever 186 move to the right. Spring 188 pulls levers 190 and 192 downward. In the downward position of lever 190, accumulator valve 18 is shut to preserve the accumulator pressure. Lever 192 moves downward to open valve 194 to short circuit the pump 102 so that it performs no work while the rotor and shaft 10 are turning at low speeds so that the pump does not tend to stop the windmill.

It is desirable to maintain pressure in the accumulator so that the accumulator may always provide sufficient force to move the second connecting rod inward and center the roller to stop the output pump at low windmill speeds at which the output pump might tend to stop a slowly moving rotor.

While the invention has been described with reference to specific embodiments, modifications and variations of the invention may be constructed without departing from the scope of the invention.

The scope of the invention is defined in the following claims.

I claim:

1. In a windmill having a wind driven element operating a piston pump, a control system comprising:
  lever means interposed between said element and said pump for varying the length of stroke of the piston in said pump, control means, responsive to changes in the velocity of the wind driven element to operate said lever means to vary the length of stroke and hence the effective displacement of said pump in accordance with available wind energy, said control means comprising means connected to the wind driven element for sensing speed of the wind driven element and response means connected to the speed sensing means and to the lever means for changing the lever means to vary length of the stroke of the pump in response to the speed of the wind driven element, wherein the wind driven element comprises a vertical shaft, a gear box further connected to the shaft, a crank connected to the gear box, a connecting rod connected to the crank and a first lever arm connected to the connecting rod remote from the crank and wherein the lever means comprises a second adjustable lever arm connected to the first lever arm and wherein the piston pump comprises a pump rod, a pump jack connected to the pump rod, a second connecting rod connected to the pump jack remote from the pump rod and connected to the adjustable lever arm.

2. The control system of claim 1 wherein the response means comprises auxiliary pump means and means connecting the auxiliary pump means to the wind driven element, accumulator means connected to the auxiliary pump means for accumulating energy from the auxiliary pump means, motor means connected to the lever means for changing the lever means and valve means connected to the motor means for directing energy to the motor means in response to the speed sensing means, wherein the auxiliary pump and motor means are connected to the lever means.

3. The control system of claim 2 further comprising feedback means connected to the valve means and to the lever means for changing the valve means to discontinue application of energy to the motor means upon changing of the lever means in response to the speed sensing means.

4. The control system of claim 1 wherein the response means comprises an auxiiary pump and means connecting the auxiliary pump to the wind driven element, conduit means connected to the auxiliary pump, accumulator means connected to the conduit means for accumulating hydraulic pressure supplied to the conduit means by the auxiliary pump, hydraulic cylinder means connected to the conduit means and to the lever means for changing the lever means in response to application of hydraulic fluid to the hydraulic cylinder means and valve means connected to the conduit means for controlling flow of fluid to and from the hydraulic cylinder means and valve controlling means connected to the speed sensing means for controlling the condition of the valve means in response to sensed speed of the wind driven element.

5. The apparatus of claim 4 wherein the conduit means comprises a hydraulic pump output line connected to the auxiliary pump and to the accumulator and check valve means connected in the auxiliary pump output line for permitting flow of hydraulic fluid from the auxiliary pump toward the accumulator and for preventing flow of hydraulic fluid from the accumulator toward the auxiliary pump, a pressure supply line connected to the accumulator for suplying hydraulic fluid under pressure to the valve means and first and second actuator lines connected to opposite ends of the hydraulic cylinder and wherein the valve means comprise first and second valve means for connecting the first and second actuator lines respectively to the pressure line and to the return line and respectively in response to changing position of the valve control means to connect one actuator line to the hydraulic pressure line and the other actuator line to a hydraulic pump return line.

6. A pump control system for high speed windmills comprising
 a piston pump, a wind driven shaft, a gear box connected to the wind driven shaft, a crank connected to the gear box, an adjustable oscillating lever means, first connecting means for connecting the crank to the lever means and second connecting means for connecting the oscillating lever means to the piston pump, an auxiliary pump connected to the oscillating lever means for pumping hydraulic fluid in response to movement of the first connecting means, accumulator means connected to the auxiliary pump for accumulating hydraulic fluid under pressure from the auxiliary pump, hydraulic cylinder connected to one of the connecting means for controlling the length of the oscillating lever means from zero to a maximum, first and second hydraulic supply lines connected to the hydraulic cylinder for driving a piston within the cylinder in a first direction to effectively lengthen the oscillating lever means and in a second opposite direction to effectively shorten the oscillating lever means to zero length, valve means connected to the hydraulic conduit and to the hdyraulic cylinder supply lines for selectively pressurizing one of the supply lines and exhausting the other of the supply lines, valve control means connected to the valve means for controlling operative condition of the vlave means and speed responsive means connected to the shaft means and to the valve control means for controlling the valve control means according to speed of the shaft.

7. The pump control system of claim 6 further comprising;
 feedback means connected to one of the connecting means and to the valve control means for changing the valve control means and shutting off the valve means when the oscillating lever means has been effectively lengthened or shortened according to the valve control means.

8. In a windmill having a wind driven element operating a piston pump, a control system comprising:
 lever means interposed between said element and said pump for varying the length of stroke of the piston in said pump,
 control means, responsive to changes in the velocity of the wind driven element to operate said lever means to vary the length of stroke and hence the effective displacement of said pump in accordance with available wind energy, said control means comprising means connected to the wind driven element for sensing speed of the wind driven element and response means connected to the speed sensing means and to the lever means for changing the lever means to vary length of the stroke of the pump in response to the speed of the wind driven element, wherein the response means comprises an auxiliary pump and means connecting the auxiliary pump to the wind driven element, conduit means connected to the auxiliary pump, accumulator means connected to the conduit means for accumulating hydraulic pressure applied to the conduit means by the auxiliary pump, hydraulic cylinder means connected to the conduit means and to the lever means for changing the lever means in response to application of hydraulic fluid to the hydraulic cylinder means and valve means connected to the conduit means for controlling flow of fluid to and from the hydraulic cylinder means and valve controlling means connected to the speed sensing means for controlling the condition of the valve means in response to sensed speed of the wind driven element, and wherein the conduit means comprises a hydraulic pump output line connected to the auxiliary pump and to the accumulator and check valve means connected in the pump output line for permitting flow of hydraulic fluid from the auxiliary pump toward the accumulator and for preventing flow of hydraluic fluid from the accumulator toward the auxiliary pump, a pressure supply line connected to the accumulator for supplying hydraulic fluid under pressure to the valve means and first and second actuator lines connected to opposite ends of the hydraulic cylinder and wherein the valve means comprise first and second valve means for connecting the first and second actuator lines respectively to the pressure line and to the return line and respectively in response to changing position of the valve control means to connect one actuator line to the hydraulic pressure line and the other actuator line to a hydraulic pump return line.

* * * * *